United States Patent [19]
Hall

[11] Patent Number: 5,509,316
[45] Date of Patent: Apr. 23, 1996

[54] SYSTEM FOR MEASURING THE TORQUE APPLIED TO A THREADED CONNECTION BETWEEN SECTIONS OF OILFIELD PIPE

[75] Inventor: Terry Hall, Belle Chasse, La.

[73] Assignee: Connection Technology Ltd., New Orleans, La.

[21] Appl. No.: 331,569

[22] PCT Filed: Apr. 30, 1993

[86] PCT No.: PCT/US93/04242

§ 371 Date: Oct. 31, 1994

§ 102(e) Date: Oct. 31, 1994

[87] PCT Pub. No.: WO93/22640

PCT Pub. Date: Nov. 11, 1993

[51] Int. Cl.[6] ........................................ G01L 5/00
[52] U.S. Cl. ........................ 73/862.25; 73/862.23
[58] Field of Search ................ 73/862.25, 862.23; 173/176, 183

[56] References Cited

U.S. PATENT DOCUMENTS

| | | | |
|---|---|---|---|
| 2,281,226 | 4/1942 | Boles | 73/862.25 |
| 2,527,456 | 10/1950 | Schmeling | 73/862.25 |
| 3,368,396 | 2/1968 | Van Burkleo et al. | 73/862.25 |
| 4,091,451 | 5/1978 | Weiner et al. | 73/862.25 X |
| 4,137,758 | 2/1979 | Rodland | 73/862.25 |
| 4,289,021 | 9/1981 | Nelson | 73/862.25 |

*Primary Examiner*—Richard Chilcot
*Assistant Examiner*—Ronald Biegel
*Attorney, Agent, or Firm*—Pravel, Hewitt, Kimball & Krieger

[57] ABSTRACT

A system for accurately determining the torque applied to threadable pipe members, such as casing, to be threaded together, comprising a torque wrench having a first end secured to one of the pipe members, and a second end forming an extendable handle portion, a cable secured to the handle portion for pulling in the direction to impart rotational force on the pipe members to complete the connection, and a plurality of wire strain gages embedded in the wall of a pin member inserted adjacent the distal end of the wrench for recording the torque applied to the pipe member by the torque wrench and the cable member.

9 Claims, 8 Drawing Sheets

SYSTEM FOR MEASURING THE TORQUE APPLIED TO A THREADED CONNECTION BETWEEN SECTIONS OF OILFIELD PIPE

BACKGROUND OF THE INVENTION

1. Field of the Invention

The system of the present invention relates to threaded pipe used in the oil industry. More particularly, the present invention relates to a System for accurately measuring the applied torque to a threaded connection between oilfield tubular products, such as drill collars, drill pipe, casing or other tubing, so that the pipe is threaded to the necessary torque.

2. General Background

In the field of oil and gas production, in recovery of the hydrocarbons from within the earth, the oil or gas is searched for (via drilling) and flowed to the surface through a plurality of sections of production pipe threaded end to end. These "strings" may be thousands of feet in length and include thousands of threaded connections. In order to properly assemble the strings, the sections are threaded together, and each adjoining section is torqued to a certain foot/pounds of torque to insure that the joint does not leak, which may result in having to pull the string out of the hole and repair or re-torque the joint or joints.

Although the reference has been to oil well casing, it should be made clear that the present system disclosed in this application applies to any threaded tubular members used in the oil field, where a certain torque needs to be achieved between the threaded members, and in fact, may apply to any use where threaded sections of pipe are used in industry.

In the state of the art of oilfield pipe connections, the torquing of these various connections is accomplished by the use of torque wrenches (manual or hydraulic) positioned around a joint to torque up the connection between the sections of pipe forming the joint. A cable or the like is run from the end of the torque wrench to a pulley apparatus which creates a pulling force on the wrench handle to in turn tighten the joint. In the case of a hydraulic power wrench (torque) a snub line or dead man line is positioned between one end of the wrench and a fixed object to prevent the wrench from spinning around the pipe as opposed to turning the pipe. A system is utilized, known in the art, whereby the amount of torque being applied to the pipe connection is recorded on a gauge, so that, theoretically, the operator knows the torque being applied. It is crucial that the operator know the amount of torque, so that he is assured that the threaded connection has been tightened sufficiently so as to avoid leakage down hole.

However, in the gauge's recordation of the torque as it is actually being applied to the threaded connection, an improper readout will occur if the angle between the cable and the wrench is anything other than 90 degrees. If the center line of the wrench is not perpendicular to the cable, forming an angle less than or greater than 90 degrees, then the force applied to the connection will be less than what is indicated on the gauge. By definition, if the force is less that what is indicated by the gauge, the pipe connection may not be completely tight and may result in leakage, damage, etc.

Several patents are identifiable which address the problem of the resolution of force when dispensed non-perpendicularly to the axis of a moment arm. These patents are more thoroughly identified in the Prior Art Submission, which will be submitted herewith.

Summary of U.S. Pat. No. 4,289,021, issued to Nelson, entitled "Tongs Having Torque Indicator Thereon" relates to an entire tong and although Nelson notes the significance of perpendicularity in the patent, he fails to address a resolution of the problem. As long as the Nelson force sensor is located in close proximity to the jaws (as opposed to the distal end of the lever arm), the angle problem is never encountered. If, however, a load cell were located at the distal end of the lever arm, it would only be accurate at 90° since Nelson has made no provision nor claimed a method to correct for non-perpendicularity.

The Nelson patent further embeds a compression or tension load cell into the body of the tong, which would require substantial modification to existing tongs in use.

In U.S. Pat. No. 4,730,254, issued to Voden, Jr., entitled "Drill String Make-Up And Breakout Torque Control System And Apparatus", Voden distinguishes himself in the prior art as having made provision for the correction of vertical angle deviation. Voden utilizes a complex array of mechanical angle measuring devices, advising his computer of the various angles of forces, then has the computer calculate the perpendicular force. Voden, because of this complex method of calculating, would require an inordinate amount of time to compute the amount of torque being applied.

U.S. Pat. No. 4,137,758, issued to Rodland, entitled "Torque Indicator Apparatus" and U.S. Pat. No. 4,202,208, issued to J. Byrne, entitled "Hydraulic Torque Indicator" and U.S. Pat. No. 4,567,779, issued to P. Byrne, entitled "Method And Apparatus For Torque Monitoring" all involve mechanical angle correcting/measuring or controlling devices to resolve force, and thus ultimately determine the force perpendicular to the axis of the moment arm. These methods are slow, cumbersome and require substantial modification or addition to existing accepted equipment designs.

U.S. Pat. No. 4,501,335, issued to Gann, entitled "Method And Apparatus For Use In Drill String Make Up" involves the use of an optical or shaft encoder to determine the angle of pull which can then be used by a computer to calculate force. Such a design is slow and highly impractical since encoders are fragile electronic devices not generally intended for use in hazardous, harsh environments, such as the oilfield. Installation would require substantial modification and/or addition to existing tongs and undoubtedly meet with resistance in the field.

SUMMARY OF THE PRESENT INVENTION

The system of the present invention solves the shortcomings in the art in a simple and straightforward manner. What is provided is a system for accurately determining the torque applied to threadable pipe members, such as casing, to be threaded together (via coupling or otherwise), a torque wrench having a first end secured to one of the pipe members, and a second end forming an extendable handle portion, a pulling means, such as a cable secured to the handle portion for pulling the handle in the direction to impart rotational force or power wrench on the pipe members to complete the connection, means intermediate the end of the handle and the cable, for recording the torque being applied to the pipe member by the torque wrench in all instances as a 90 degree relationship between the torque wrench and the cable member, and means for visually recording the force being applied to the threadable members.

In the instance where powered tongs are used to couple the sections of casing, the invention is applicable, except that the handle of the power tong is secured to a fixed object by snub line, so that the power tong, whose jaws tighten the joint by separate movement from the handle, does not rotate. In this instance, the means for recording the torque, such as a load cell, is secured in the snub line which is attached in the same manner as with the manual torque wrench.

An additional embodiment positions a plurality of multiple strain gauges embedded in a metal pin at the distal end of the lever arm, which measure and resolve shear forces to ultimately generate an electrical impulse to a computer indicating the amount of force applied perpendicularly. The computer multiplies the force by the length of the moment arm, and when a predetermined amount of torque is reached a pressure relief valve is activated to kill the power. In this particular embodiment, depending on the location of the strain gauges, the strain gauges would be equipped to sense the force when the wrench and pulling cable are on the same plane as the strain gauges measuring the force.

There is further an additional embodiment where the multiple strain gauges would be replaced with a rod inserted in the body of the pin at the distal end of the lever arm, with the rod incorporating a plurality of strain gauges end to end around the circumferencial surface of the rod, so that any force which would be applied in a 360° direction on the distal end of the tong arm would be sensed and resolved into a force component equal to the force applied perpendicularly in the wrench plane.

In both of the embodiments which utilize the strain gauges, the strain gauges would sense the tension or compression of the wires, and emit a voltage equated to force, which has been precalibrated. The computer, upon receipt of the voltage signal would in turn multiple the precalibrated number by the length of the moment arm to determine the amount of force in foot/pounds. When a particular amount of voltage has been received by the computer which would be translated ultimately into the pounds of force, the computer would activate a dump valve to release the pull on the torque wrench.

Therefore, it is a principal object of the present invention to record the force being applied to a threaded joint between pipe members by a torque wrench accurately even though the angular relationship between the wrench and the cable is other than 90 degrees;

It is a further object of the present invention to provide a system for accurately determining the amount of torque applied to tighten a threaded joint between sections of casing, drill collars, drill pipe and the like, even though the angle between the torque wrench and the cable is other than 90 degrees;

It is a further object of the present invention to allow a well operator to torque such pipe connections with a torque wrench and obtain an accurate readout of the amount of torque applied despite the position or angle between the torque wrench and the cable attached to the torque wrench;

It is a further object of the present invention to provide a system to measure accurately the amount of torque being applied to joints of well pipe, whether the wrench applying the force is a manual wrench or a power tong;

It is a further object of the present invention to provide a system to measure accurately the amount of torque being applied to joints of pipe whether the wrench applying the force is a manual wrench or a power tong, through the positioning of a member on the end of the handle of the torque wrench so that when torque is applied to the member, the torque is measured through the compression or extension of a strain gauge within the member that can be recorded in the computer as the actual torque being applied to the pipe joint;

It is a further object of the present invention to provide a system to measure accurately the amount of torque being applied to joints of oil well pipe through the use of multiple strain gauges, or through the use of a rod inserted in the distal end of the tong for sensing torque applied over a 360° angle; and It is a further object of all embodiments of the present invention to provide a system for measuring torque on pipe joints where a single electrical impulse sensed by a strain gauge means is sent to a computer which resolves the perpendicular force, and therefore requires no calculation by the computer except to multiply the sensed force by the length of the moment arm.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
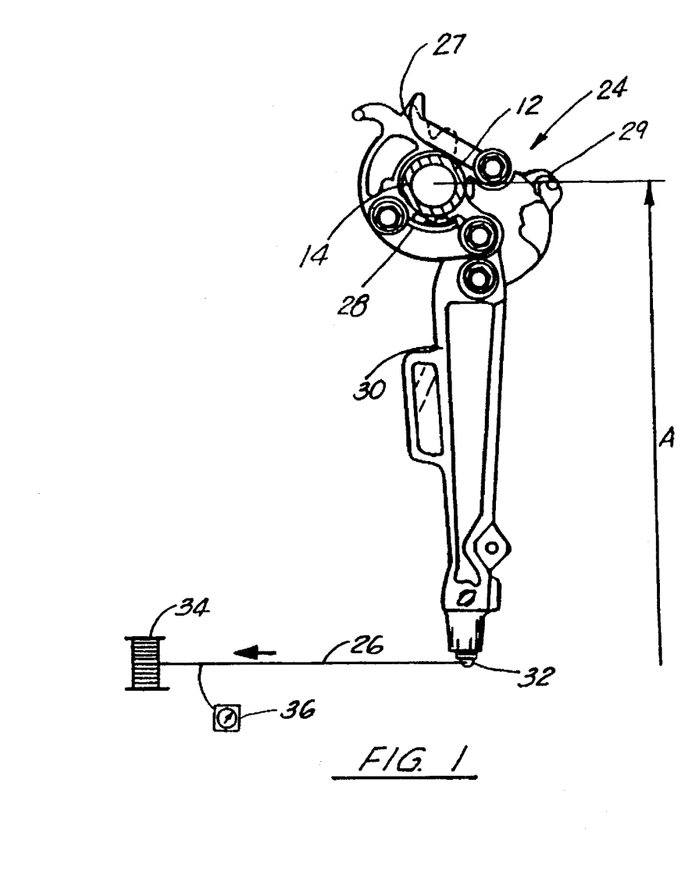
FIG. 1 illustrates in top view the current state of the art of the manual torque wrench.

One principal embodiment of the system of the present invention as illustrated by the numeral 10 in FIGS. 2 through 5 and 6 as utilized with a manual torque wrench and a power torque wrench, also known as a power tong, and a second principal embodiment of the present invention is illustrated in FIGS. 8 through 14 thereof. Prior to a discussion of the system of the present invention, reference is made to FIG. 1 which illustrates in top view the current state of the art in determining the torque applied to pipe when two segments are threadably engaged using a standard torque wrench. In FIG. 1 there is illustrated a cross-section of pipe member joint 12, wherein an upper member of pipe would be threadably engaged to a lower member, each member including a box end and a pin end, with each end including continuous threads for forming a threaded connection 14 between the box end of one member and the pin end of the second member so that a completed threaded connection is obtained. For purposes of this application, the type of threaded members would normally be sections of production pipe which is used in the drilling for or recovery of oil and gas from within the earth through a continuous connection of sections of pipe. However, the system could be applied to any threaded connection where the principles would be applicable.

As seen in FIG. 1, the threaded connection 14 must be obtained which is leak-proof. Therefore, a great deal of force must be applied to the connection to assure the connection is secure. In order to achieve this, the state of the art utilizes a wrench member 24, which includes a first end 27 having opposing jaws 28, 29 which engage around the wall of the pipe above the pipe joint 12. The wrench 24 further comprises an extended handle portion 30 extending out from the jaws 28, 29 so that a rotational force can mechanically be applied to rotate the wrench and pipe. Because of the size of the pipe, in most cases, and the size of the wrench 24 needed to complete the connection, this means to mechanically apply the force needed to rotate the wrench and pipe usually includes a cable 26 connected on its first end to the distal end 32 of handle 30 and at its second end to a powered spool 34 so that rotation of the spool 34 pulls the handle 30 of wrench 24 the necessary distance to complete the threaded joint between the sections of pipe.

There would be further provided a means 35, including a torque gauge 36, for monitoring the force being applied by the cable 26 to the end of the handle 30, and translating this force into foot/pounds of torque, so that the operator knows the amount of torque being applied to the pipe joint 14.

Figures 3, 5:
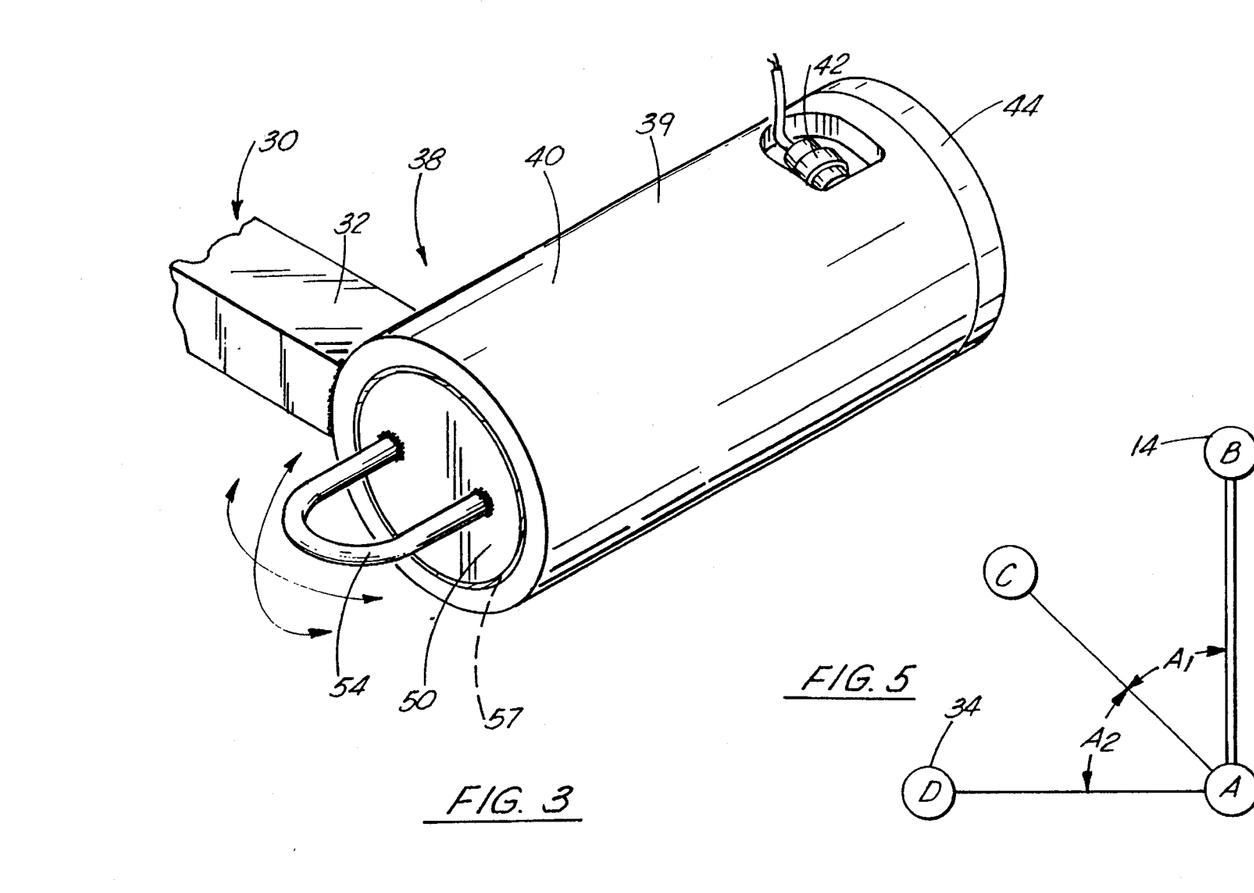
FIGS. 3 and 4 illustrate in overall and cutaway views respectively the torque gauge apparatus utilized in the present invention.
FIG. 5 illustrates a representational view of the angle of pull when determining the torque being applied to a manual torque wrench.

Reference is made to FIG. 5, where B represents the pipe joint 14, D represents the powered spool 34, and A1+A2 the angle formed between the wrench and the spool line. In determining accurately this torque, it is necessary that there be maintained a 90 degree angular relationship between the lines BA and AD. It is only when this angle is 90 degrees, as explained earlier, that the operator will receive an accurate readout of the amount of torque being applied to the pipe joint. When the angle of force directed to the handle 30 of wrench 24 results in an angle greater or less than 90 degrees, the effective force is reduced. For example, if 1000 pounds of pulling force is exerted at point C along the CA line, a 45 degree angle (A1), the resultant force at point B is 710 foot pounds. When the same pulling force is exerted at the point D along the DA line, a 90 degree angle, the resultant force at B is 1000 foot pounds. Therefore, the 90 degree angle of pull is critical in obtaining accurate readouts of force on the torque gauge.

Figure 2:
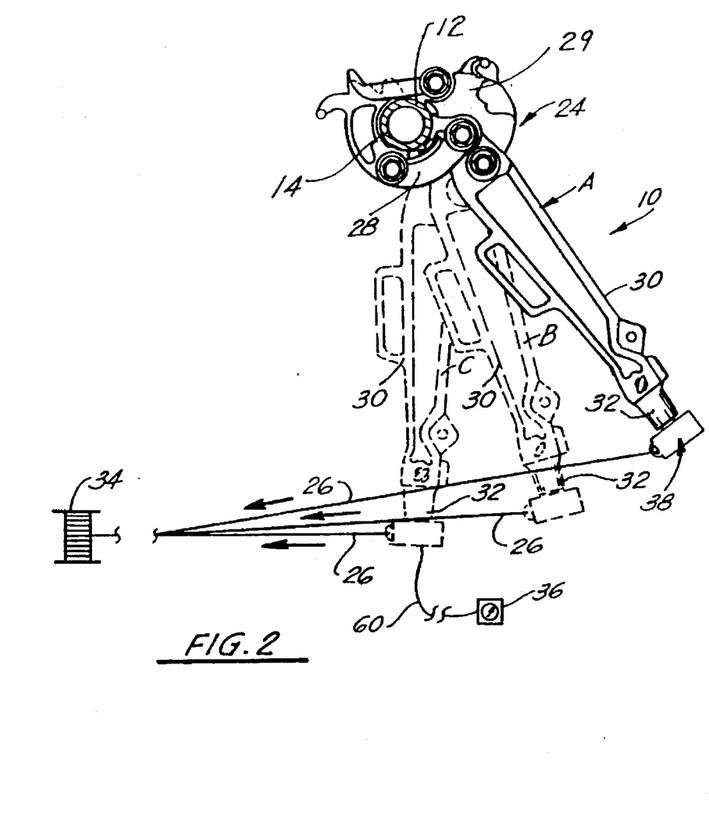
FIG. 2 illustrates in top view the preferred embodiment of the present invention used with a manual torque wrench.
Figure 4:
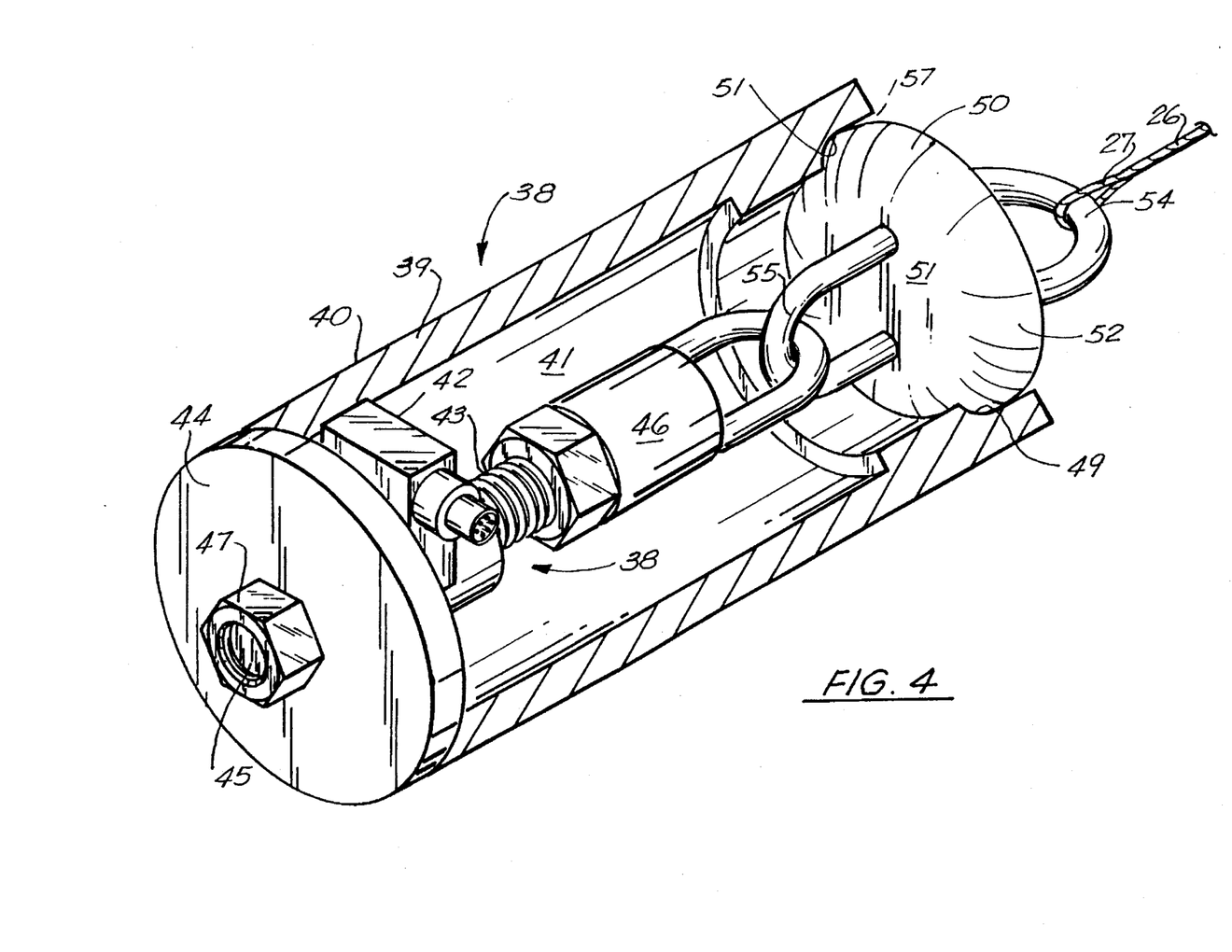

In order to assure this accurate readout, reference is made to FIGS. 2–4 which illustrate the use of the present invention utilized with a manual torque wrench 24. As illustrated in the figures, there is provided a load cell means 38 positioned intermediate the end of handle 30 and the first end of cable 26 to insure that any readout received by the operator regarding the amount of force being applied is a readout of the force being applied in the 90 degree relationship, although the position of wrench handle 30 is not 90 degrees from the position of powered spool 34. As seen in phantom view in FIG. 2, when the jaws 28, 29 bite into the wall of pipe joint 12, the wrench 24 may be in any position, such as the three positions (A,B,C) as illustrated in FIG. 2. The load cell means 38 attached to the distal end 32 of handle portion 30 insures that the torque being applied to the joint 12 will be accurately reflected in the torque gauge 36.

As seen in FIGS. 3 and 4, this load cell means 38 includes a housing 40, circular in cross section, and having an inner-opening 41. The housing would be securely fixed to the end 32 of the handle 30 through welding or the like along the sidewall 39 of housing 40, so the position of the housing is at a right angle to the length of the handle 30. Within housing 40 there would be provided a load cell 42, consisting of either an electronic strain gauge or electronic hydraulic transducer. Load cell 42 would be firmly secured to a first end 44 of housing 40 via a bolt 45 or the like. The cell would include an attachment member 46, such as a threaded rod 43, threaded or secured to 42 so that force applied at an eyelet 54 by line 26 will be recorded as the torque applied to the joint 12, although the angle between the load cell means 38 and the wrench is at other than 90 degrees.

The ability of the load cell means 38 to record the accurate torque readout is due to the fact that the force applied by line 26 will be resolved against the body 40 and produce a corrected 90 degree readout from load cell 42. The means allowing this resolution of force provides that attachment member 46, on its second end, would be linked to the second end 50 of the housing 40, so that end 50 would be maintained in position to form the closed end of housing 40. End 50 would have an eyelet 54 on its outer surface for attaching the end 27 of cable 26 thereto. End wall 50, as illustrated provides a curved rear wall 51 would be set within a concave recess 49 formed in the wall 39 of housing 40, and would provide a means for resting on the curved shoulder 53 formed by the concave recess 49. This curved rear wall 51 would be linked via line 55 to attachment member 46 and therefore connected to the load cell 42 as previously described. It is crucial that there be a small space 57 (FIG. 3) formed between the continuous curved edge 52 of rear wall 51 and the shoulder 53 of concave recess 49 so that there may be some side way slipping movement of the end wall 50 in relation to the concave recess 49. There would be provided a transmission line 60 leading from the load cell 42 to a torque gauge 36 and then to a microprocessor, of a type already known in the art, to record readings received from the load cell 42 during operation. Although the curved rear wall 51 making contact with the side wall 39 to resolve the force is the preferred embodiment at this time, it is foreseen that any means, such as a linear motion bearing, may be employed to accomplish the resolution.

During the process, the torque wrench 30 would be secured around one piece of pipe 12 with the load cell means 38 secured to the handle 30 as described previously. The cable 26 would be secured to the eyelet 54 formed on the wall 50 of load cell housing 40 on its first end and to the powered spool 34 on its second end. Upon force being applied to the cable 26, the force would be in turn imparted to the load cell means 38 to record the amount of force being applied. When the force from the cable is perpendicular to the position of handle 30, the microprocessor will provide the readout of force in foot/pounds of torque. Furthermore, unlike the current state of the art, should the wrench 24 be positioned at an angle other than the 90 degrees from the spool 34, (as seen in the various positions in FIG. 2), because of the manner in which the load cell 42 is receiving the pull from the cable 26, through the shiftable end plate 50 of housing 40, the load cell 42 will always receive the force as a 90 degree force between the joint 14 and the spool 34, and therefore, the readout will be an accurate readout of the amount of torque being applied.

When the situation occurs with the system of the present invention that the angle of force is less or greater than 90 degrees, the pull received and recorded by the load cell is always the resultant force at 90 degrees, despite the angular relationship between the cable 26 and wrench 30. As stated earlier, the reason for this occurring is that the force will be resolved between the end plate 50 and the sidewall 39 of load cell 42, at any point where the end plate 50 makes contact along its curved rear wall 51 with the shoulder 53 of recess 49. Therefore, because of the resolved force due to an angle of pull other than 90 degrees, one would always know that the readout is the accurate force being applied to the wrench handle 30, although the actual force necessary to achieve that readout may be more. In turn, the operator, if he requires a certain force to be applied, knows when the readout registers that required force, that is the force being received by the pipe, despite the actual pull force needed to achieve that readout.

Figure 7:
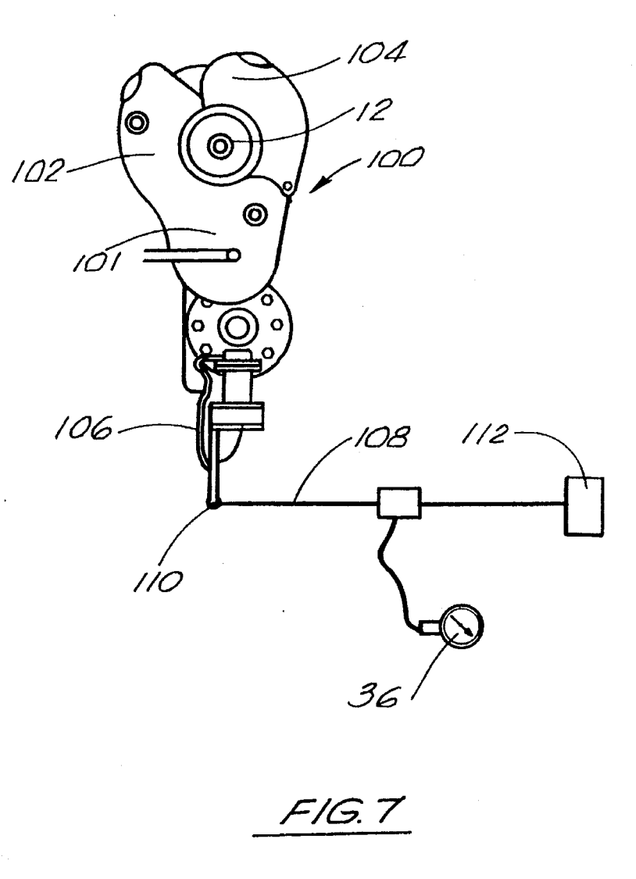

FIG. 7 illustrates the use of a power tong 100 in connecting pipe joints in the present state of the art. As illustrated, a typical power tong has a body portion 101, comprising a pair of hydraulically operated jaws 102, 104, wherein the jaws are operated within the body portion 101 to tighten the connection between joints of pipe 12. However, unlike a manual wrench as previously described, the handle 106 of the power tong 100 must be secured to a fixed point to avoid rotation of the entire tong body 101 when the jaws 102, 104 begin tightening the joint. This is achieved by the use of a snub line 108, known in the art, which is a wire attached from the end 110 of handle 106 of the tong to a secure point, such as a column or the like, represented by 112. Therefore, when the jaws 102, 104 begin their operation, the handle is prevented from moving because of the snub line. The driller attempts to place the snub line at a 90 degree angle from the wrench handle so as to achieve a true torque reading. However, this often fails, and an untrue torque reading at gauge 36 is obtained.

Figure 6:
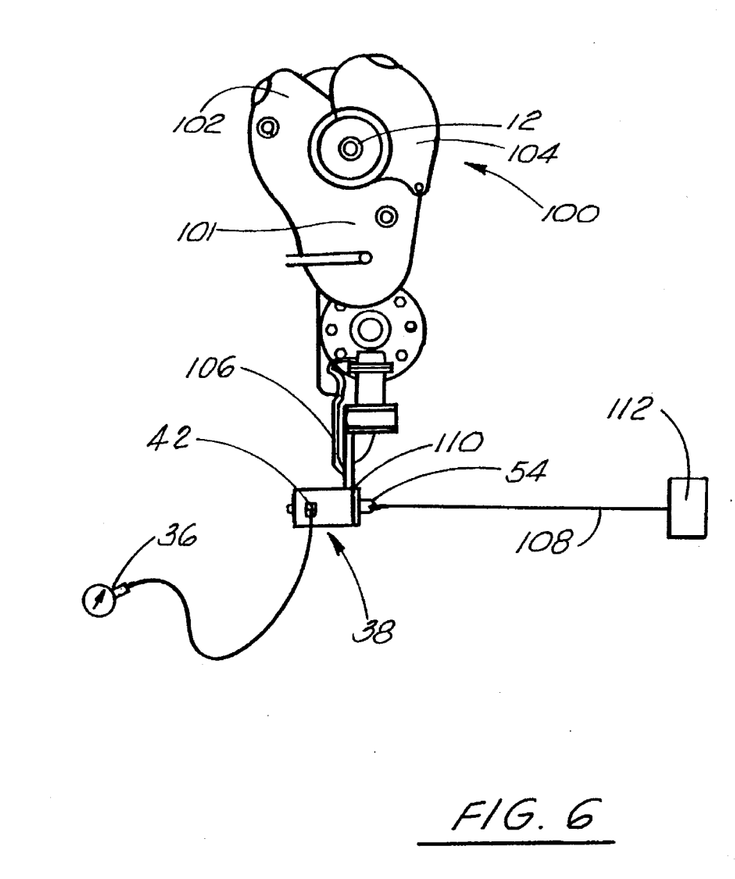
FIGS. 6 and 7 illustrate top views of a power torque wrench used in the present state of the art, and the present invention being used with a powered torque wrench, respectively.

Therefore, as illustrated in FIG. 6, the present invention 10 would be utilized, so that the load cell means 38 would be secured, as with the manual wrench, to the end 110 handle 106 of the tong 100, and the snub line 108 would be attached to eyelet 54 on one end and to the fixed point or column 112. Therefore, when the force would be applied to the joint by the power tong 100, the snub line 108 pull would be recorded by the load cell 42, and the true torque being applied to the joint in foot/pounds would be recorded at gauge 36. Therefore, in essence, whether a manual wrench or power tong is used, the present invention operates to resolve the force as previously described, and a true reading of torque applied to the joint is able to be obtained.

Figure 8:
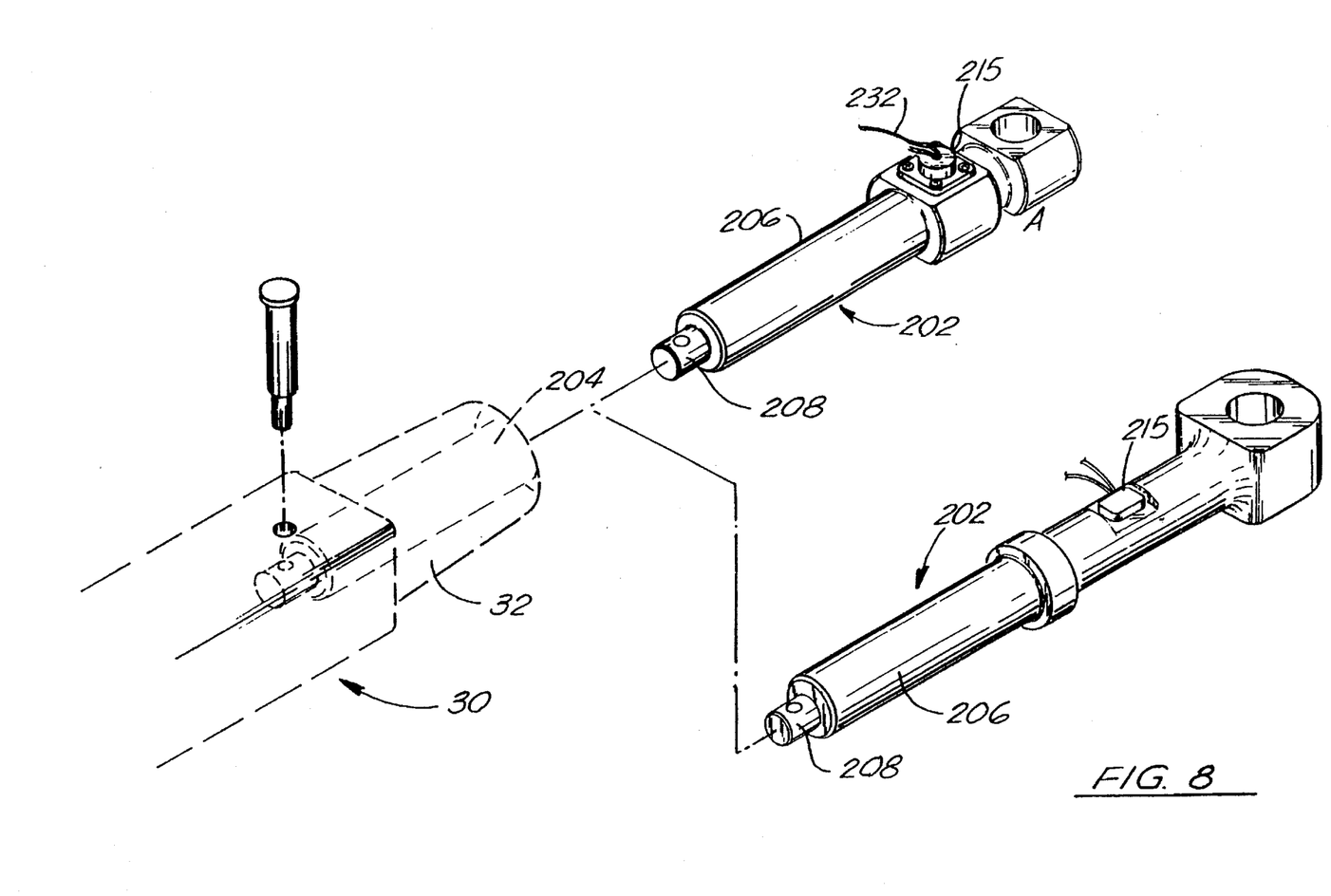
FIG. 8 illustrates an additional principal preferred embodiment of the present invention.
Figures 9, 10, 11:
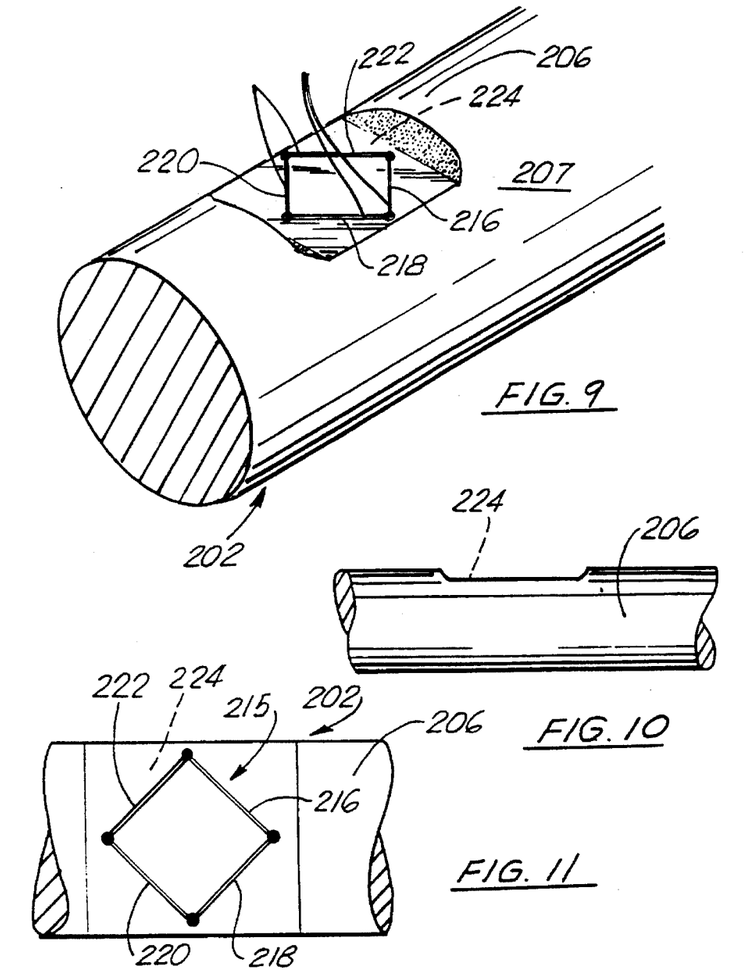
FIG. 9 represents an isolated view of the strain gauge component of the embodiment of the invention as illustrated in FIG. 8.
FIG. 10 illustrates a side view thereof.
FIG. 11 illustrates a top view of the bridge component of the embodiment as illustrated in FIG. 8.

FIGS. 8 through 14D illustrate a second preferred embodiment of the apparatus of the present invention as illustrated by the numeral 200. As illustrated in FIG. 8, there is seen the distal end 32 of handle portion 30 illustrated in phantom view. It should be made clear that most, if not all manual torque wrenches include a pin member insertable into a bore in the distal end 32 of handle 30, with the pin member having an attachment eye on its end, for attaching the cable 26 thereto when torque is being applied to the wrench. This process was discussed earlier in the first preferred embodiment.

As illustrated in FIG. 8, there is illustrated a modified pin 202, which would be inserted into a bore 204 in the end of handle 30, as is done in most manual torque wrenches. The modified pin 202 as illustrated in FIG. 8, includes a principal body portion 206, with a reduced pin end 208 so that when the body portion 206 is inserted into the bore 204 of handle 30, a lock pin 210 is inserted into a bore 211 in the pin end 208 and therefore the modified pin 202 is held in place.

As is illustrated in FIG. 8, there are two embodiments illustrated of the pin 202 that would be utilized in this embodiment of the invention. For purposes of discussion, both of these types of pins would be inserted into handle 30 in the same manner, and would function in the same manner. What is illustrated in FIG. 8, is simply a difference in the structural make-up of the two modified pins 202, (designated as A and B), and for purposes of functioning, both would function in an identical manner.

Turning now to the modification in the pin 202, reference is made to FIGS. 8 through 14D in their entirety. As illustrated, whether it be pin member A or B as illustrated in FIG. 8, the modification would be in the pin's body 206 which would incorporate a means for detecting torque being applied to the pin 202, and thus to the wrench itself, as line 26 (FIG. 13) is pulled in order for the torque wrench to impart the correct amount of torque in engaging sections of oilfield pipe end to end. This means would include a system known as a strain gauge means 215. As illustrated, particularly in FIGS. 9 through 11, strain gauge means 215 comprises a plurality of wire members 216, 218, 220, and 222, formed preferably in a rectangular or square pattern, on the body portion 206 of pin member 202. In the preferred embodiment, a portion of the wall 207 of pin member 202 would be formed into a recessed area 224, where each of the wire members 216, 218, 220, 222 would be positioned, as a strain gauge means.

Figure 12:
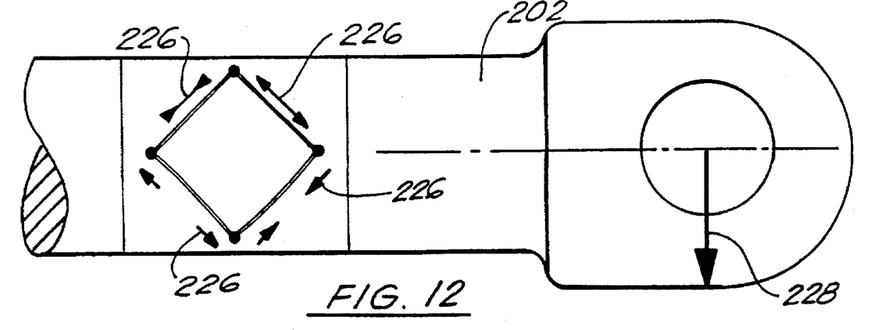
FIG. 12 illustrates a torque being applied to the end of the member as illustrated in FIG. 8.

As further illustrated in FIG. 12, each of the wire strain gauges would be responsive to a particular direction of torque being applied to the pin 202 as force is applied to the torque wrench via wire 26. In FIG. 12, this force is designated by arrows 226 as indicating the direction of force being applied against each of the strain gauges 216, 218, 220, 222 when torque is applied to the pin 202 via the wire 26 indicated by arrow 228. This force signal is then transmitted to the computer as resolved perpendicular force being applied to the drill pipe joint. When the proper amount of force is sensed, a dump valve is activated which interrupts all power to line 26.

Figure 13:
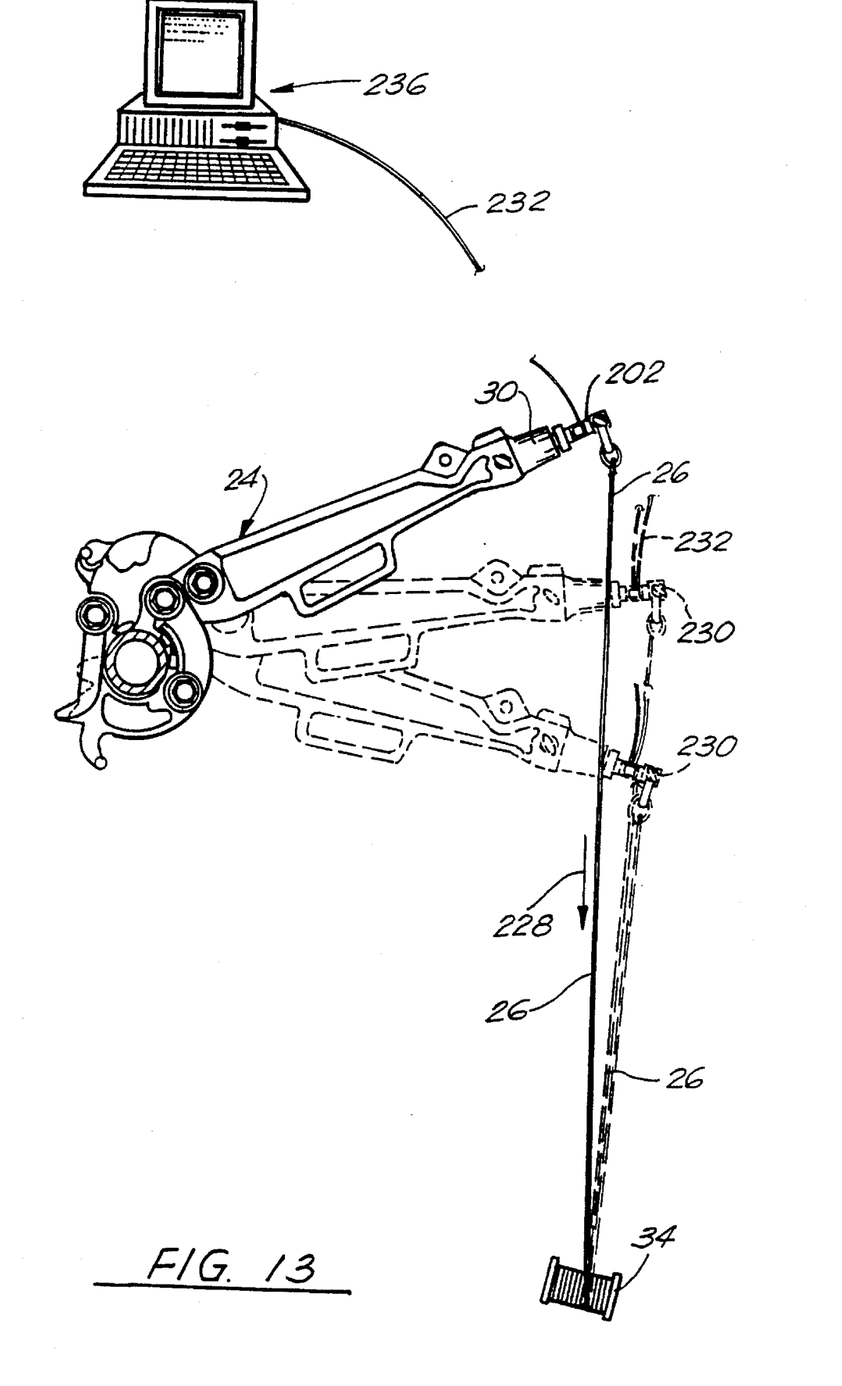
FIG. 13 illustrates an overall view of the embodiment as illustrated in FIG. 8 being utilized with a torque wrench in the engagement of pipe joints.

For example, in FIG. 13, there is illustrated the torque wrench 24, having the modified pin 202 inserted into its end 30. There is a line 26 attached to the end of pin member 202. Upon transmission of the proper signal, a powered spool 34 would impart a pull on line 26 in the direction of Arrow 228 as seen in FIG. 13, and as seen in isolated view in FIG. 12. This pulling of the wrench would impart a rotation of the wrench up to a certain point 230, as illustrated in phantom view in FIG. 13, so that upon its positioning of the wrench to its fullest rotation, further pull on line 26 would impart a slight bending of the modified pin 202 in the end of the wrench 24 in the direction of the powered spool 34. The bending of the pin 202 would create a slight disfigurement whether it be extension or retraction of the individual strain gauges 216, 218, 220, 222 embedded in the wall of pin 202, as explained earlier in relation to FIG. 12, depending on the direction of pull. Any minute stretching or retraction of the strain gauges, will result in an electronic signal received via transmission line 232 to the computer terminal 236. The computer terminal would be equipped with software which would receive the resolved force signal and convert same into a figure to record the amount of torque being applied directly onto the pin 202, and therefore in actuality to the torque wrench itself and to the joint of pipe. Therefore, the strain gauge system would be responsible for effecting a direct readout of the amount of torque being applied to the makeup of the drill pipe during the process rather than the load cell means 38 that had been described in the principal embodiment.

This particular embodiment utilizes a strain gauge system, and would entail a simple modification of a standard pin member of a typical manual torque wrench 24, sold by several companies, so that the pin could be replaced by the modified pin 202. Therefore, the system of the present invention could be utilized without having to modify whatsoever the actual torque wrenches themselves.

Figure 14A:
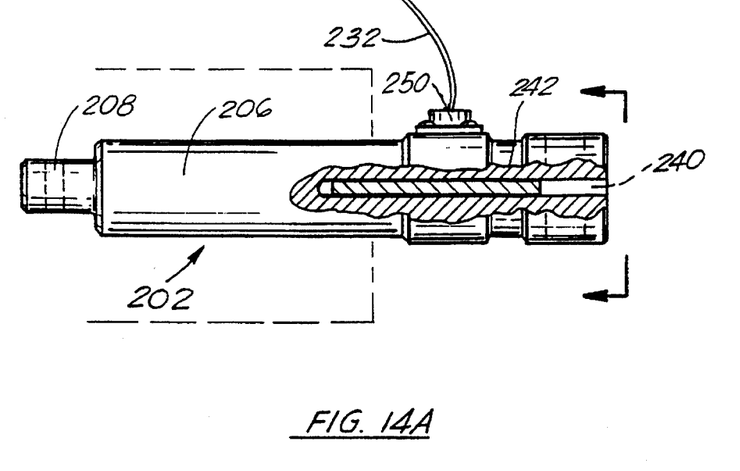
FIGS. 14A through 14D illustrate an embodiment of the apparatus utilizing a rod as the strain gauge component of the apparatus of the present invention.
Figure 14B:
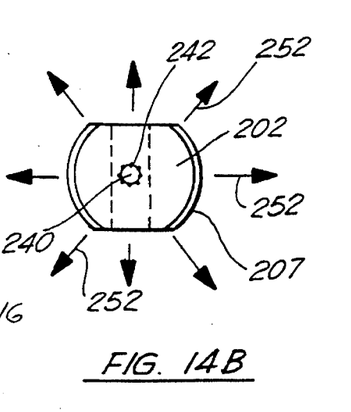
Figure 14C:
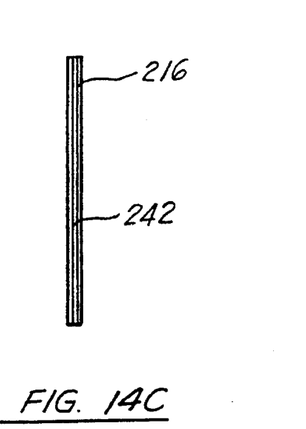
Figure 14D:
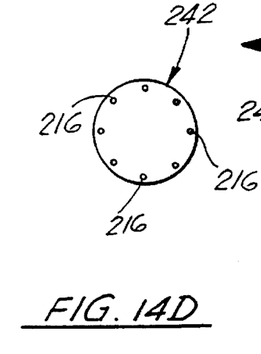

Yet, a further embodiment of the present invention is illustrated in FIGS. 14A through 14D. In this particular embodiment, the pin member 202 is further modified. Rather than the use of the individual strain gauges 216, 218, 220, 222 in the wall of the pin 202, there is provided a bore 240 through the body portion 206 of pin 202, running longitudinally thereof. The bore 240 is of sufficient depth to allow a metal rod 242 constructed of a type of metal for accommodating a plurality of wire strain gauges around its circumference, which is illustrated in FIG. 14D. The rod 242 would be inserted into the bore 240 and positioned tightly within bore 240. There would be further included a sensing means 250 secured to the wall 207 of the pin member 202, to which wire 232 would transmit a readout of any torque sensed by the sensing means when force is applied to the pin 202. In this manner, when there is a strain or pull on the arm of the handle portion 30, the plurality of strain gauges 216 positioned around the outer wall of pin 242 would be either stretched or compressed, which in either case would then present a voltage readout to the sensing means 250, which would then be transmitted to the computer as discussed previously.

In this particular embodiment, the positioning of metal rod 242 would be positioned within the central bore 240, as seen in the end view in FIG. 14B. The positioning of the metal rod 242 within bore 240 as illustrated would enable the sensing means 250 to receive a signal of any torque applied to the pin 202 during the makeup process, in any direction whatsoever, over 360 degrees. Because of the central location of the rod 242 within bore 240, the application of a pulling force against pin member 202 from any direction, as indicated by Arrows 252 in FIG. 14B, rod 242 would likewise undergo a certain amount of bending or torque and would the torque would be sensed by sensing means 250 and transmitted via line 232 to computer 236 for readout as perpendicular torque applied. The result would be the same as discussed in the previous embodiments.

It should be noted that in this particular embodiment, the sensing may occur on a 360° torque pull as opposed to the other embodiments where the strain gauges would be positioned on one plane or a pair of planes, and therefore would only record torque in the plane of the positioning of each strain gauge and could not record torque in any direction perpendicular to the positioning of the strain gauge. This particular embodiment, again, would require a simple modification of existing torque wrenches, by the insertion of the metal rod in the pin member, and utilizing the sensing means to detect torque applied.

Glossary of terms:
system 10
pipe joint 12
threaded connection 14
torque wrench 24
first end 27
jaws 28, 29
handle portion 30
distal end 32
powered spool 34
cable 26
means 35
torque gauge 36
load cell means 38
housing 40
inner opening 41
sidewall 39
load cell 42
threaded rod 43
first end 44
bolt 45
attachment member 46
nut 47
tension spring 48
concave recess 49
second end 50
curved end wall 51
curved shoulder 53
eyelet 54
link 55
cable end 27
recess 49
space 57
continuous edge 52
transmission line 60
power tong 100
body portion 101
jaws 102, 104
handle 106
snub line 108
handle end 110
column 112
pin 202
body 206
stain gauge means 215
strain gauges 216, 218, 220, 222
wall 207
recessed area 224
arrows 226
arrow 228
point 230
transmission line 232
computer terminal 236
bore 240
metal rod 242
sensing means 250

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for accurately measuring the amount of force applied to a threaded pipe connection, the system comprising:
   a) at least a first and second section of pipe, to be threadably connected together on their end portions;
   b) a wrench means for applying torque to sections of pipe engagable around at least one of the pipe members during connection;

c) means for exerting a pulling force on the wrench means to tighten the sections of pipe to a predetermined torque; and d) a plurality of wire strain gauges embedded in the wall of a pin member inserted adjacent the distal end of the wrench means for receiving the pulling force on the wrench means, and for registering that pulling force to be recorded as actual torque on the connection.

2. The system in claim 1 further comprising a sensing means for sensing the amount of the force imparted on the torque wrench.

3. The system in claim 1 wherein the means for exerting a pulling force on the wrench means comprises a length of cable attached on its second end to a powered spool.

4. The system in claim 1 wherein there is further provided a computer to receive the sensed force imparted on the torque wrench and recording the force as the amount of torque applied to the joint of pipe being made up.

5. The system in claim 1 wherein the strain gauge means senses the amount of pulling force from the cable as a force imparted perpendicular from the wrench means.

6. A system for accurately measuring the amount of force applied to a threaded pipe connection, the system comprising:

a) at least a first and second section of pipe, to be threadably connected together on their end portions;

b) a torque wrench having a first end engagable around at least one of the pipe members during connection and a second end comprising an extendable handle;

c) cable means engaged to a pin in the extendable handle for exerting a pulling force on the torque wrench to tighten the connection between the sections of pipe to a predetermined torque;

d) a plurality of strain gauges positioned in the wall of the pin at the distal end of the extendable handle for sensing pulling force applied to the wrench during makeup of the sections of pipe; and e) means for registering the pulling force sensed by the plurality of strain gauges as force imparted 90 degrees from the position of the wrench means although the position may be less than or greater than 90 degrees, said force recorded as torque applied to the pipe joint.

7. The system in claim 6, wherein the means positioned in the wall of the pin further comprises a plurality of strain gauges for sensing the amount of force imparted on the joint of pipe.

8. A system for accurately measuring the amount of force applied to a threaded connection between sections of pipe, the system comprising:

a) at least a first and second sections of pipe, to be threadably connected together on their respective end portions;

b) a torque wrench having a first end engagable around at least one of the sections of pipe during connection and a second end comprising a handle extending out from the pipe;

c) cable means for exerting a pulling force on the torque wrench to tighten the connection between the sections of pipe to a predetermined torque;

d) a pin member positioned in the distal end of the torque wrench for attaching the cable means to the torque wrench, the pin member further comprising a means for sensing the amount of pull force applied to the torque member, the sensing means further comprising a metal rod positioned within a bore in the pin member which senses any bending of the pin member, said force sensed transmitted to a computer for registering as torque applied to the pipe joint.

9. The system in claim 8, wherein the metal rod positioned in the pin member senses force applied to the pin member in a 360 degree direction.

* * * * *